Jan. 23, 1934.     C. D. ST. CLAIR     1,944,474
PULVERIZER
Filed July 16, 1929
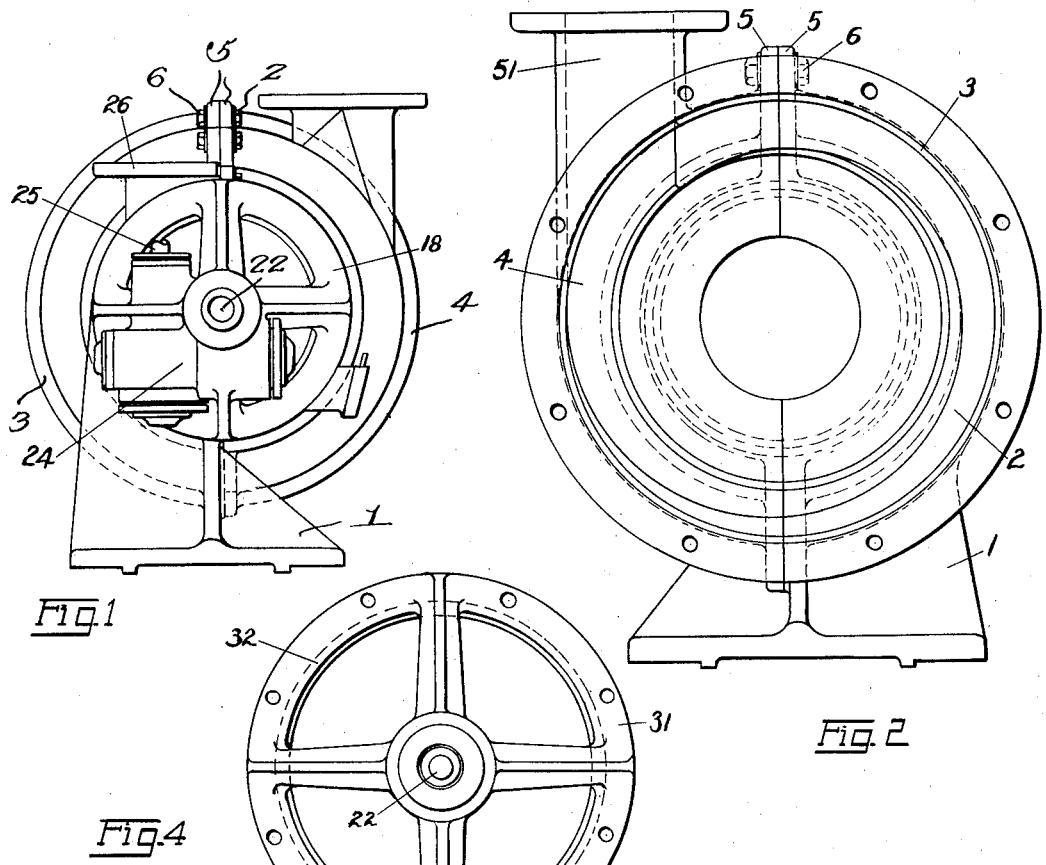
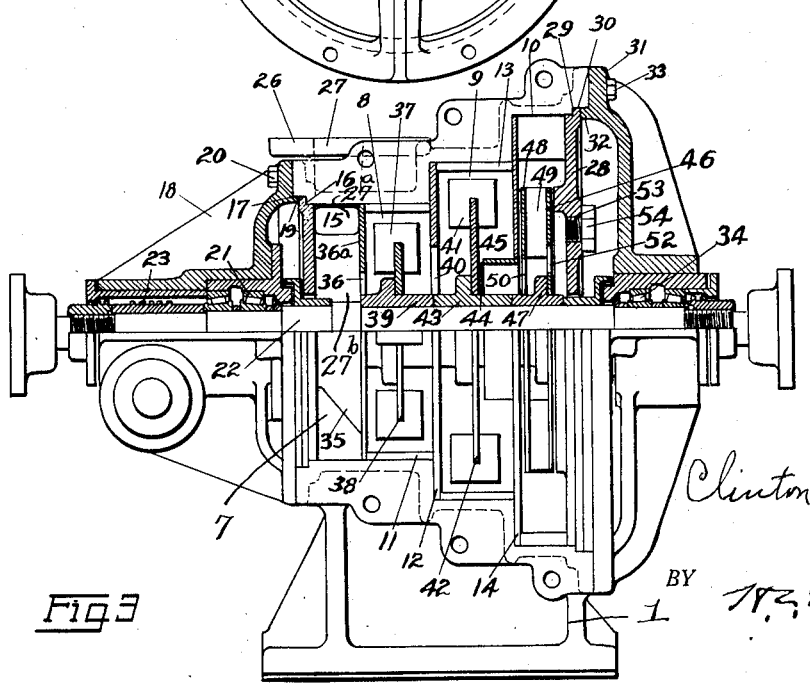

Patented Jan. 23, 1934

1,944,474

UNITED STATES PATENT OFFICE 1,944,474

PULVERIZER

Clinton D. St. Clair, Erie, Pa., assignor to Erie City Iron Works, Erie, Pa., a corporation of Pennsylvania Application July 16, 1929. Serial No. 378,749

7 Claims. (Cl. 83—11)

The present invention is designed to form a pulverizer which may be readily fabricated and readily serviced and so constructed as to occupy a minimum of space.

In the servicing of pulverizers, it is necessary to open the housing of the pulverizer so as to renew the operating parts and to observe its condition. In the fabricating of pulverizers it is desirable to have the parts that are machined so exposed that the machining operation may be carried on with rapidity and it is also desirable, particularly in many installations, such as on ship board to conserve space. The pulverizer according to the present invention may be readily serviced, is so constructed that it may be readily machined and fabricated, and occupies a very small space compared to its capacity. Features and details of the invention will appear from the specification and claims.

A preferred embodiment of the invention is illustrated in the accompanying drawing as follows:—

Fig. 1 shows an end view of the pulverizer.

Fig. 2 an end view of the housing, the view being from the large end.

Fig. 3 an enlarged view with the front housing removed and part of the pulverizer mechanism in section.

Fig. 4 an end view of the fan end bearing.

1 marks the base. A housing 2 is mounted on the base. This is preferably formed in two parts 3 and 4, the rear part 3 being preferably cast integrally with the base. The parts are provided with flanges 5 and bolts 6 are passed through these flanges securing the parts of the housing together. The housing has a feed compartment 7, the first step, or breaker compartment 8, the pulverizer compartment 9 and the fan compartment 10.

A lining 11 is arranged in the compartment 8. This is preferably split, the parting being coincident with the parting of the housing. A diaphragm 12 in the form of an annular disc separates the chambers 8 and 9, the housing, as shown, being stepped and the chamber 9 being somewhat larger than the chamber 8, the diaphragm 12 seating on the face of the step. A lining 13, similar to the lining 11, is provided for the chamber 9 and a diaphragm 14 separates the chamber 9 from the fan chamber 10. The housing is again stepped between the chambers 9 and 10 and the diaphragm 14 is seated on the step. The diaphragms are annular one-piece structures so that when the housing is separated these rings remain in place.

A feed end plate 15 is provided with a stepped periphery 16 which seats in a notched end 17 of the housing, the smaller part of the stepped periphery fitting within the smaller diameter of the housing and the outer diameter of the periphery seating on the cylindrical surface of the notch 17. A bearing ring, or support 18 has an annular rib 19 on its face which extends into the notch 17 against the end plate 15. The face of the ring engages the end of the pulverizer and is secured thereon by bolts 20. A bearing 21 is provided in the ring in which a pulverizer shaft 22 is journaled. The shaft carries a gear 23 which drives a shaft 25 through a transmission carried in transmission housings 24 (see Fig. 1) for the feeder (not shown), the feeder being mounted on a flange 26 at the upper end of a feeder tube 27. A front end 28 has a stepped periphery 29 and is arranged in a groove 30 in the large end of the pulverizer, the smaller diameter of the edge 29 fitting into the periphery of the fan chamber and the outer dimension of the periphery 29 fitting the cylindrical wall of the groove 30. A bearing ring 31 has an annular rib 32 which extends into the groove 30 and the ring is secured on the end face of the housing by bolts 33. The ring 31 carries a bearing 34 in which the fan end of the shaft 22 is journaled. It will be noted that if the bolts securing the rings 18 and 31 to the front halves of the housings are removed this half of the housing may be removed from the rear half leaving the shaft and pulverizer elements in place. Thus in servicing the pulverizer this front half may be removed so as to renew the paddles, liners, or other parts. Again, if it is desired the bolts between the rings and the rear housing may be removed in which event the bearing rings with the shaft and all the pulverizer parts, including the feeder can be removed with the front half leaving the base in place.

The feeder tube 27 discharges through an opening 27a into a feeder chute 27b which has a deflected bottom 35 and delivers material through an opening 36 in a diaphragm 36a. The material is caught by the paddles 37 in the chamber 8. These paddles are mounted on a disc 38 and the disc is carried by a hub 39 fixed on the shaft 22. Material passes from the chamber 8 through an opening 40 in the diaphragm 12 into the chamber 9 and is caught by the paddles 41. These paddles are carried by a disc 42 and the disc 42 is mounted on a hub 43 and this hub is fixed on the shaft 22.

The material is fed out of the compartment 9 through a restricted or metered opening 44 between the end of an adjustable tube 45 and the disc 42 and the material passes from the tube 45 to the fan chamber 10. The fan has an outer disc 46 which is secured on a hub 47. The hub is fixed on the shaft 22. The fan has an inner disc 48 and fan blades 49 connect the discs 46 and 48. The disc 48 has an opening 50 at the center which receives the material. The fan draws the material through the pulverizer and discharges it through a discharge tube 51 which, as shown, is carried by the front half of the housing.

It is sometimes desirable to add a greater amount of air through the fan in order to prevent choking with certain materials and for this purpose the fan disc 46 is provided with openings 52 which openings communicate with openings 53 in the end 28. More or less of the openings 53 may be closed with plugs 54, as shown.

In the operation of the pulverizer fuel is fed through the feeder tube 27, carried through the pulverizer in the usual manner, and delivered by the fan to the point of use.

In machining the pulverizer the two parts of the housing may be secured together and the large end of the housing being entirely open and exposed permits of carrying into it heavy machining apparatus which increases very materially the rapidity with which these surfaces may be machined. This is made possible by providing the housings with removable ends. These removable ends may be one-piece structures and the removable end at the feed end may be utilized for carrying the feed tube.

As before stated, the ring supports for the bearings not only permit of this wide opening in the housing for machining purposes but also maintain the pulverizer intact as the front half of the housing is removed so that it is a very simple matter to service the pulverizer. This arrangement of the feeder tubes directly in the case reduces the overall length of the pulverizer materially and the simplicity with which the parts may be removed for servicing reduces the space necessary for operating the pulverizer so that the pulverizer is peculiarly advantageous in situations where space is limited.

What I claim as new is:—

1. In a pulverizer, the combination of a base; a pulverizer housing on the base, said housing having a horizontal axis and being split to form front and rear portions; and a discharge tube on the front portion, the front portion being removable with the discharge tube from the rear portion, and without disconnecting the rear portion from the base.

2. In a pulverizer, the combination of a base; a pulverizer housing on the base, said housing having a horizontal axis and being split to form front and rear portions; a feed tube secured to the rear portion of the housing; and a discharge tube secured to the front portion, the front portion being removable without disconnecting the feed tube, or the rear portion from the base.

3. In a pulverizer, the combination of a housing, said housing having a horizontal axis and being split forming front and rear portions; a feed tube on the rear portion; a bearing support on each end of the housing; and a shaft bearing on the support, the front housing being removable without disturbing the bearings, or the feed tube.

4. In a pulverizer, the combination of a split housing having a horizontal axis and annular end seats; removable ends seated in said end seats; removable bearing supports seated on the ends of the housing and centering therewith; and bearings on said supports coaxial with the housing.

5. In a pulverizer, the combination of a split housing having annular end seats, said housing being stepped; annular diaphragms in the housing seated on the seats and dividing the housing into compartments; split liners within the housing; removable ends seated in said annular end seats, the feed end carrying a feed chute; bearing supports centering on the housing; bearings carried by the supports coaxial with the housing; a shaft carried by the bearings; pulverizing elements; and a fan carried by the shaft and arranged within the housing, one part of the housing being removable without disturbing the bearings.

6. In a pulverizer, the combination of a base; a pulverizer housing on the base, said housing being split to form front and rear portions; a bearing support mounted on each end of the housing; shaft bearings on the supports; a beater shaft journaled in the bearings; and pulverizer elements mounted on the shaft, the front of the housing being removable without disturbing the rear housing, or the bearing supports, and the bearing supports being removable with the beater shaft upon the removal of the front housing and without disturbing the rear housing.

7. In a pulverizer, the combination of a base; a pulverizer housing on the base, said housing being split to form front and rear portions; a bearing support mounted on each end of the housing; shaft bearings on the supports; a beater shaft journaled in the bearings; pulverizer elements mounted on the shaft, the front of the housing being removable without disturbing the rear housing, or the bearing supports, and the bearing supports being removable with the beater shaft upon the removal of the front housing and without disturbing the rear housing; and removable housing ends secured by the bearing supports.

CLINTON D. ST. CLAIR.